United States Patent [19]

Naarmann et al.

[11] Patent Number: 5,174,867
[45] Date of Patent: Dec. 29, 1992

[54] PREPARATION OF ELECTRICALLY CONDUCTIVE, FINELY DIVIDED PYRROLE POLYMERS

[76] Inventors: Herbert Naarmann, 15 Haardtblick, 6719 Wattenheim; Walter Heckmann, 2 Geiersbergstrasse, 6940 Weinheim; Gernot Koehler, 32 Berner Weg, 6700 Ludwigshafen; Petr Simak, 17 Philipp-Scheidemann-Strasse, 6700 Ludwigshafen, all of Fed. Rep. of Germany

[21] Appl. No.: 584,315

[22] Filed: Feb. 28, 1984

[30] Foreign Application Priority Data

Mar. 7, 1983 [DE] Fed. Rep. of Germany ....... 3307954

[51] Int. Cl.⁵ .................. C25C 11/00; H01B 1/06
[52] U.S. Cl. .................. 204/59 R; 252/500; 252/511; 252/518; 252/520; 252/519; 252/521
[58] Field of Search ............... 252/500, 511, 518, 519, 252/520, 521; 524/495, 496, 700, 783, 784, 785, 786, 847, 850; 526/258; 204/72, 78, 10, 12, 13, 59 R, 291, 58.5

[56] References Cited

U.S. PATENT DOCUMENTS

| | | | |
|---|---|---|---|
| 3,574,072 | 4/1971 | Louvar | 204/72 |
| 3,991,007 | 11/1976 | Perronin et al. | 524/850 |
| 4,269,760 | 5/1981 | Wakimoto et al. | 524/850 |
| 4,314,931 | 2/1982 | Hoffend et al. | 252/511 |
| 4,401,545 | 8/1983 | Naarmann et al. | 204/291 |
| 4,468,291 | 8/1984 | Naarmann et al. | 204/13 |
| 4,547,270 | 10/1985 | Naarmann et al. | 204/59 R |
| 4,566,955 | 1/1986 | Naarmann et al. | 252/500 |
| 4,567,250 | 1/1986 | Naarmann et al. | 252/500 |

FOREIGN PATENT DOCUMENTS 2124635 2/1984 United Kingdom.

OTHER PUBLICATIONS

Chemical Abstract vol. 99 No. 22, 28 p. 190–Abstract No. 179038n.
Chemical Abstract vol. 99 No. 10.5 p. 40 Abstract No. 71762e.

*Primary Examiner*—Josephine Barr

[57] ABSTRACT

Electrically conductive, finely divided pyrrole polymers are prepared by a process in which a pyrrole is polymerized in the presence of a carrier and are used for the production of shaped articles and coatings.

7 Claims, No Drawings

PREPARATION OF ELECTRICALLY CONDUCTIVE, FINELY DIVIDED PYRROLE POLYMERS

The present invention relates to a process for the preparation of electrically conductive, finely divided pyrrole polymers by polymerization of pyrrole in the presence as a carrier, and to the use of the said polymers for the production of shaped articles and for coatings.

It is known that pyrrole, or other compounds from the class comprising the pyrroles, can be polymerized electrochemically in the presence of a conductive salt, the materials being deposited as a film on the anode. The products are p-conductive polypyrroles which incorporate the anions of the conductive salts. Under defined electrolysis conditions, particularly where the voltage is maintained to give an appropriate current density, it is possible to deposit on the anode electrically conductive pyrrole polymers, even in finely divided form.

For many purposes, for example for the production of components for the electronics industry, electric switches and special electrode materials, electrically conductive pyrrole polymers have to be converted to the desired use form by means of a further processing step. For example, powder pyrrole polymers have to be processed to appropriate shaped articles result in a reduction in the conductivity in comparison with polymers deposited anodically as a film.

It is an object of the present invention to provide a process for the preparation of electrically conductive, finely divided pyrrole polymers, which is easy to carry out and has wide application, the electrical conductivities of the resulting finely divided pyrrole polymers meeting the requirements set.

We have found that this object is achieved by a process in which a pyrrole is polymerized in the presence of a finely divided carrier.

The present invention furthermore relates to the use of the electrically conductive, finely divided pyrrole polymers prepared in this manner for the production of shaped articles and coatings.

The conductive, finely divided pyrrole polymers obtained according to the invention have a high conductivity of, in general, from 1 to $10^2$ S/cm and also possess good mechanical properties. The finely divided copolymers have good performance characteristics and can be used, for example, for the production of electrodes, catalysts, storage systems, batteries, switches, semiconductor components, screening materials and solar cells. They can also be employed for the anti-static treatment of plastics and as coating materials, for example for producing screens against radiation. The novel finely divided pyrrole polymers will constitute a technical advance wherever it is desirable to have good mechanical properties and low specific gravity coupled with good conductivity.

Pyrroles which are suitable for the novel process include pyrrole itself as well as substituted pyrroles, such as N-alkylpyrroles, N-arylpyrroles, and pyrroles which are monosubstituted or disubstituted at the carbon atoms by alkyl or halogen. For the process according to the invention, it is possible to use pyrrole either alone or as a mixture with other compounds from the class comprising the pyrroles. Preferably, unsubstituted pyrrole itself is used. If substituted pyrroles are employed, 3,4-dialkyl pyrroles where alkyl is of, in particular, 1 to 4 carbon atoms and 3,4-dihalopyrroles, in particular 3,4-dichloropyrrole, are preferred.

If desired, certain amounts of other compounds which are copolymerizable with pyrroles can also be present.

Examples of suitable compounds which are copolymerizable with pyrroles are azulene and its derivatives, such as benzazulene and guaiazulene, as well as fulveneindene and quadratic acid. Heterocyclic compounds, such as imidazole, thiazole, furan, thiophene, 2-bromothiophene, 2,6-dimethylpyrridine and pyrazine, can also be used. From 1 to 10 parts of the compounds which are copolymerizable with pyrrole can be employed per 10 parts of pyrrole.

Carriers which are suitable for the process are natural or synthetic compounds which preferably contain acidic groups or can be protonated by the addition of protic acids or acidic substances, such as potassium bisulfate or similar compounds. The carriers may contain acidic groups arising directly from their preparation, e.g. metal oxides or oxide hydroxides precipitated in acidic solution, or can be rendered acidic by the addition of an acid or an acidic salt, e.g. carbon black which is provided with acidic groups at the surface, and is solvated, by the addition of benzene sulfonic acid. Examples of suitable carriers are sulfonated polystyrene, sulfonated lignin, aluminas, silicates, titanium oxides or oxide hydroxides, cobalt oxides, chromium oxides, graphite, barium ferrite, barium titanate, tin dioxide and indium oxides. Other suitable compounds are salts, e.g. $KHSO_4$, $KPF_6$, $LiClO_4$, $NaF$ and $BF_4$, and acids, e.g. picric acid, citric acid, oxalic acid, toluene sulfonic acid and the like.

The finely divided carriers have a mean particle size of from 0.001 to 1000, preferably from 0.1 to 100 μm, and a specific surface area of from 10 to 1000 $m^2/g$, measured by means of nitrogen adsorption. The polymerization of the pyrroles in the presence of the finely divided carriers is advantageously carried out in the presence of auxiliary liquids. Particularly suitable examples of these are organic solvents, such as methanol, ethanol, polyols, acetone, tetrahydrofuran, acetonitrile, methylene chloride and glacial acetic acid. However, polymerization can also be carried out in water, if appropriate mixed with a water-miscible liquid.

From 0.1 to 50, preferably from 1 to 25, parts of the finely divided carrier are used per part of pyrrole or of a mixture of pyrroles or of a mixture of pyrroles with other compounds.

The auxiliary liquids are used either as solvents or as suspending agents. For example, the pyrroles or the other monomers dissolve in the solvent, and the finely divided additives can generally only be suspended. The amount of auxiliary liquid is from 10 to 1000 parts by weight per 100 parts by weight of the finely divided carrier.

In choosing the weights of the pyrroles, or the mixtures of pyrrole with other compounds, and of the auxiliary liquid and the carrier, care should be taken to ensure that not less than 0.1 part by weight, preferably from 5 to 100 parts by weight, of auxiliary liquid are employed per 100 parts of the mixture of pyrrole and carrier.

In an electrochemical process for the polymerization of a system comprising pyrroles, auxiliary liquid and carriers, electrolytes can, if required, be added in order to increase the conductivity. Particularly suitable electrolytes are the alkali metal or ammonium salts of $PF_6^-$ $ClO_4^-$, $BF_4^-$ and $AsF_6^-$, and furthermore organic acids such as benzene sulfonic acid and the like. These conductive salts are known and, if desired, can also be used as carrier materials provided that they satisfy the above conditions in respect of particle size and specific surface area. However, it is essential that conductive salts used as carriers are suspended in the auxiliary liquid. For the polymerization, the conductive salts are dissolved in the particular system.

area of about 100 $m_2/g$. The particles are converted under a pressure of 100 bar and at 25°C. to give shaped articles having a measured electrical conductivity of 55 S/cm.

EXAMPLES 2 TO 10

The procedure described in Example 1 is followed, except that the carrier materials and the monomers are varied. The following results are obtained:

| Ex- | Carrier* | | Monomer | | Yield, | Conductiv- |
|---|---|---|---|---|---|---|
| ample | Amount | Type | Type | Amount | in parts | ity, S/cm |
| 2 | 5 | Carbon black | Pyrrole | 25 | 3.5 | 58 |
| 3 | 1 | $TiO_2$ | Pyrrole | 25 | 3 | 50 |
| 4 | 1 | $Ti_2O_3$ | Pyrrole | 25 | 3 | 48 |
| 5 | 1 | Polystyrene sulfonated | Pyrrole/thiophene 12.5 | 12.5 | 3.5 | 35 |
| 6 | 1 | $Al_2O_3$ | Pyrrole/furane 12.5 | 12.5 | 3 | 42 |
| 7 | 1 | $SnO_2$ | Pyrrole/indene 12.5 | 12.5 | 3.6 | 48 |
| 8 | 1 | Graphite | Pyrrole/cyclopentadiene 12.5 | 12.5 | 3.0 | 41 |
| 9 | 1.5 | Barium titanate | Pyrrole | 10 | 3.0 | 46 |
| 10 | 3 | Barium ferrite | Pyrrole | 10 | 3.6 | 45 |
| 11 | 1 | Perylene tetracarboxylic acid | Pyrrole | 20 | 2.8 | 35 |

*the mean particle diameter of the finely divided carriers is from 0.1 to 100 μm, and the specific surface area is from 10 to 1000 $m^2/g$.

If required, other assistants, such as oxidizing agents, e.g. persulfates, potassium permanganate or oxygen, may also be present during the polymerization.

The polymerization can be carried out at from -30° to 100° C., preferably from +20 to 45° C., and under a pressure of from 1 to 100, preferably from 1 to 5, bar. Reaction times of from 0.1 to 600, preferably from 1 to 10, minutes are generally required.

Electrochemical polymerization is preferred, polymerization of the monomers being effected by anodic oxidation. For this purpose, the current densities used are, for example, from 2 to 20 mAmp/$cm^2$ and the applied voltages are in general from 10 to 30 V. Where conductive salts are present during the polymerization, these are used in an amount of from 5 to 200 parts per 100 parts of monomers.

Other polymerization methods may also be used. For example, polymerization can be carried out in the presence of a strong acid and of oxygen.

The Examples which follow illustrate the invention. Parts and percentages are by weight.

EXAMPLE 1

1 part of carbon black, 10 parts of benzenesulfonic acid and 1000 parts of acetonitrile are mixed together, and the reaction mixture is introduced into a flow-through electrolysis cell which contains two 20×20 cm platinum electrodes. The electrodes are 2 cm apart and the applied voltage is 30 V, resulting in a current density of 5 mA/$cm^2$ The reaction solution is passed through the flow-through electrolysis cell for 15 minutes at 25° C., after which 15 parts of pyrrole, 10 parts of tributylamine and 600 parts of acetonitrile are added to the solution. After a reaction time of 60 minutes, a black pasty polymer has been deposited on the anodes. This is dried to give 3 parts of a fine powder having a mean particle size of about 10 μm and a specific surface

EXAMPLES 11 TO 17

The procedure described in example 1 is followed, except that the following conductive salts or carriers are used instead of benzene sulfonic acid and the other carriers stated.

| Ex- | Additional component | | Yield, | Conductivity |
|---|---|---|---|---|
| ample | Type | Amount | in parts | S/cm |
| 11 | Anthraquinone disulfonic acid | 10 | 3.2 | 52 |
| 12 | Naphthalene disulfonic acid | 10 | 3.0 | 45 |
| 13 | $KHSO_4$ | 10 | 2.8 | 47 |
| 14 | $H_3PO_4$ | 12 | 3.1 | 42 |
| 15 | Ligninsulfonic acid | 10 | 3.0 | 34 |
| 16 | $K_2S_2O_8$ | 5 | 2.5 | 39 |
| 17 | $H_2SO_4$ | 2 | 3.0 | 54 |

We claim:

1. A process for the preparation of an electrically conductive, finely divided pyrrole polymer which comprises polymerizing a pyrrole by anodic oxidation at a temperature of from −30° to +100° C. in the presence of a finely divided carrier suspended in an auxiliary liquid, said carrier having a mean particle size of from 0.001 to 1000 μm and a specific surface area of from 10 to 1000 $m^2/g$, and in the presence of a conductive salt, said conductive salt and said pyrrole being dissolved in the auxiliary liquid.

2. A process of claim 1, wherein a carrier containing acidic groups is used.

3. The process of claim 1, wherein the finely divided carrier is selected from the group consisting of carbon black, $TiO_2$, $Ti_2O_3$, sulfonated polystyrene, $AL_2O_3$, SnO$_2$, graphite, barium titanate, barium ferrite and perylene tetracarboxylic acid.

4. The process of claim 1, wherein the pyrrole is unsubstituted pyrrole.

5. The process of claim 1, wherein the pyrrole is a 3,4-dialkylpyrrole, the alkyl having from 1 to 4 carbons.

6. The process of claim 1, wherein the pyrrole is 3,4-dichloropyrrole.

7. The process of claim 1, wherein the polymerization is carried out at from 20° to 45° C. under a pressure of from 1 to 5 bar.

* * * * *

UNITED STATES PATENT AND TRADEMARK OFFICE
CERTIFICATE OF CORRECTION

PATENT NO. : 5,174,867
DATED : December 29, 1992
INVENTOR(S) : NAARMANN et al.

It is certified that error appears in the above-identified patent and that said Letters Patent is hereby corrected as shown below:

ON THE TITLE PAGE

Please insert the following Assignee information:

--[73] Assignee: BASF Aktiengesellschaft
Ludwigshafen, Fed. Rep. of Germany--.

IN THE CLAIMS

Claim 3, column 4, line 68, "$Ti_2O_3$" should read --$Ti_2O_3$--; "$Al_2O_3$" should read --$Al_2O_3$--.

Signed and Sealed this

Seventh Day of December, 1993

Attest:

BRUCE LEHMAN

Attesting Officer     Commissioner of Patents and Trademarks